(12) United States Patent
Tsuchizawa

(10) Patent No.: US 10,053,184 B2
(45) Date of Patent: Aug. 21, 2018

(54) BICYCLE MOTOR CONTROL SYSTEM

(71) Applicant: Shimano Inc., Sakai-shi, Osaka (JP)

(72) Inventor: Yasuhiro Tsuchizawa, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 9 days.

(21) Appl. No.: 14/724,745

(22) Filed: May 28, 2015

(65) Prior Publication Data
US 2016/0347406 A1    Dec. 1, 2016

(51) Int. Cl.
| | |
|---|---|
| B62M 6/50 | (2010.01) |
| B60L 7/10 | (2006.01) |
| B60L 15/20 | (2006.01) |
| B60L 11/00 | (2006.01) |
| B60W 10/00 | (2006.01) |
| B62M 6/55 | (2010.01) |
| B62J 99/00 | (2009.01) |

(52) U.S. Cl.
CPC ............... *B62M 6/50* (2013.01); *B60L 7/10* (2013.01); *B60L 11/007* (2013.01); *B60L 15/20* (2013.01); *B60W 10/00* (2013.01); *B62M 6/55* (2013.01); *B60L 2200/12* (2013.01); *B60L 2240/423* (2013.01); *B60L 2250/26* (2013.01); *B62J 2099/0013* (2013.01); *Y02T 10/645* (2013.01); *Y02T 10/7275* (2013.01)

(58) Field of Classification Search
CPC .............. B62M 6/50; B60L 15/20; B60L 7/10
See application file for complete search history.

(56) References Cited

U.S. PATENT DOCUMENTS

| | | | |
|---|---|---|---|
| 2009/0171546 A1* | 7/2009 | Tozuka | B60K 31/04 701/93 |
| 2012/0012412 A1* | 1/2012 | Moeller | B62M 6/45 180/206.2 |
| 2014/0166385 A1* | 6/2014 | Arimune | B62M 6/45 180/206.3 |

OTHER PUBLICATIONS

Wikipedia article, Right-Hand Rule, printed May 31, 2016.*

* cited by examiner

*Primary Examiner* — Alan D Hutchinson
(74) *Attorney, Agent, or Firm* — Alleman Hall Creasman & Tuttle LLP

(57) ABSTRACT

A bicycle motor control system, configured to control a drive motor that is provided on a bicycle, comprises a controller configured to control a drive motor that is configured to selectively output driving force in accordance with a manual drive force, and cause the drive motor to stop when a detected manual drive force, sensed by a manual drive force sensor, falls below a predetermined force threshold value, which is set in accordance with a crank angle of a crankshaft.

19 Claims, 10 Drawing Sheets

BICYCLE MOTOR CONTROL SYSTEM

BACKGROUND

The present invention relates to a bicycle motor control system.

Bicycle motor control systems are indispensable for electric drive assisted bicycles with drive motors, which are provided to assist a rider who applies a manual drive force to the pedals. To address the problem of optimizing the timing and amount of driving force that the drive motor applies to the bicycle to assist the rider, systems have been developed to cause a drive motor to stop when a rider applies a rearward manual drive force to the pedals. When the rider suddenly stops pedaling while the drive motor is running and continuously assisting the rider, the rider may not be able to stop the pedals and crankshaft at an intended crank angle position. If coaster brakes are provided on the bicycle and the drive motor does not stop immediately in the backpedaling action, the rider may feel discomfort and have a decreased quality in riding experience.

SUMMARY

To address the above issues, a bicycle motor control system is provided. According to a first aspect of the invention, the bicycle motor control system is configured to control a drive motor on a bicycle. The bicycle motor control system comprises a controller configured to control a drive motor that is configured to selectively output driving force in accordance with a manual drive force, and cause the drive motor to stop when a detected manual drive force, sensed by a manual drive force sensor, falls below a predetermined force threshold value, which is set in accordance with a crank angle of a crankshaft. One potential advantage of this configuration is that a user may easily stop the drive motor by ceasing the application of a manual drive force on the bicycle.

In this aspect, the controller may be configured to cause the drive motor to stop by at least one of a regenerative braking operation, dynamic braking operation, and power interruption to the drive motor. One potential advantage of this configuration is that the drive motor may avoid a sudden, abrupt stop that could cause an unpleasant user experience.

In this aspect, the predetermined force threshold value may correspond to a negative torque sensed by a torque sensor when the crank angle is within a predetermined crank angle range. One potential advantage of this configuration is that, setting the force threshold value to correspond to a negative torque at the top or bottom dead center angle will prevent the drive motor from inconsistently stopping at the top dead center and bottom dead center angles of the crankshaft when the threshold value is set at zero.

In this aspect, the predetermined force threshold value may be a threshold manual drive force at a top dead center crank angle or a bottom dead center crank angle. One potential advantage of this configuration is that the drive motor will not inconsistently stop at the top dead center and bottom dead center angles of the crankshaft when the threshold value is set at zero at the top dead center crank angle or the bottom dead center crank angle.

In this aspect, the controller may be configured to cause the drive motor to stop when a negative torque, sensed by a torque sensor, is detected to fall below a predetermined torque threshold value when a forward rotation of the crankshaft, sensed by a crank rotation sensor, is detected. One potential advantage of this configuration is that the user may stop the drive motor even when the crankshaft is not rotating rearward, thus increasing the speed of the bicycle at which the drive motor can be stopped and avoiding the unintentional actuation of a coaster brake when backpedaling to stop assist power.

In this aspect, the controller may be configured to cause the drive motor to stop when a rearward rotation of the crankshaft, sensed by a crank rotation sensor, is detected. One potential advantage of this configuration is that noise, stress to the crankshaft system, and potential damage to the motor can be averted when the crankshaft rotates in a direction that is opposite to the rotation of the drive motor.

In this aspect, the controller may be configured to cause the drive motor to stop when a positive torque, sensed by a torque sensor, is detected to fall below a predetermined torque threshold value. One potential advantage of this configuration is that a user may easily stop the drive motor by ceasing the application of a manual drive force on the bicycle.

In this aspect, the predetermined torque threshold value may be a torque between a top dead center crank angle and a bottom dead center crank angle. One potential advantage of this configuration is that positive torque can be measured at the most ideal points in the crank cycle, at angles spaced 90 degrees between a top dead center angle and a bottom dead center angle, at which the most positive torque is usually measured when the user engages in normal, forward pedaling.

In this aspect, the drive motor may be provided in a midship or rear placement configuration on a frame of the bicycle. One potential advantage of this configuration is that the placement of the drive motor will not interfere with the pedaling action of the user.

According to another aspect of the invention, a bicycle motor control system, configured to control a drive motor that is provided to a bicycle, comprises a controller configured to control a drive motor that is configured to selectively output driving force in accordance with a manual drive force, and cause the drive motor to stop when one of a plurality of conditions is satisfied. The plurality of conditions include: when a negative torque, sensed by a torque sensor, and a forward rotation of a crankshaft, sensed by a crank rotation sensor, are detected. One potential advantage of this configuration is that the user may stop the drive motor even when the crankshaft is not rotating rearward, thus increasing the speed of the bicycle at which the drive motor can be stopped and avoiding the unintentional actuation of a coaster brake when backpedaling to stop assist power.

In this aspect, the plurality of conditions may include: when a rearward rotation of the crankshaft, sensed by the crank rotation sensor, is detected. One potential advantage of this configuration is that noise, stress to the crankshaft system, and potential damage to the motor can be averted when the crankshaft rotates in a direction that is opposite to the rotation of the drive motor.

In this aspect, the plurality of conditions may include: when a positive torque, sensed by the torque sensor, is detected to fall below a predetermined torque threshold value. One potential advantage of this configuration is that a user may easily stop the drive motor by ceasing the application of a manual drive force on the bicycle.

In this aspect, the controller may be configured to cause the drive motor to stop by at least one of a regenerative braking operation, dynamic braking operation, or power interruption to the drive motor. One potential advantage of this configuration is that the drive motor may avoid a sudden, abrupt stop that could cause an unpleasant user experience.

In this aspect, the controller may be configured to cause the drive motor to stop when the negative torque, sensed by the torque sensor, is detected to fall below a predetermined torque threshold value. One potential advantage of this configuration is that the user may stop the drive motor even when the crankshaft is not rotating rearward, thus increasing the speed of the bicycle at which the drive motor can be stopped and avoiding the unintentional actuation of a coaster brake when backpedaling to stop assist power.

In this aspect, the controller may be configured to cause the drive motor to stop when the negative torque, sensed by the torque sensor, is detected at a predetermined crank angle when a forward rotation of the crankshaft, sensed by the crank rotation sensor, is detected. One potential advantage of this configuration is that the user may stop the drive motor even when the crankshaft is not rotating rearward, thus increasing the speed of the bicycle at which the drive motor can be stopped and avoiding the unintentional actuation of a coaster brake when backpedaling to stop assist power.

In this aspect, the predetermined crank angle may be a top or bottom dead center angle. One potential advantage of this configuration is that the drive motor will not inconsistently stop at the top dead center and bottom dead center angles of the crankshaft when the threshold value is set at zero at the top dead center crank angle or the bottom dead center crank angle.

In this aspect, the drive motor may be provided in a midship or rear placement configuration on a frame. One potential advantage of this configuration is that the placement of the drive motor will not interfere with the pedaling action of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
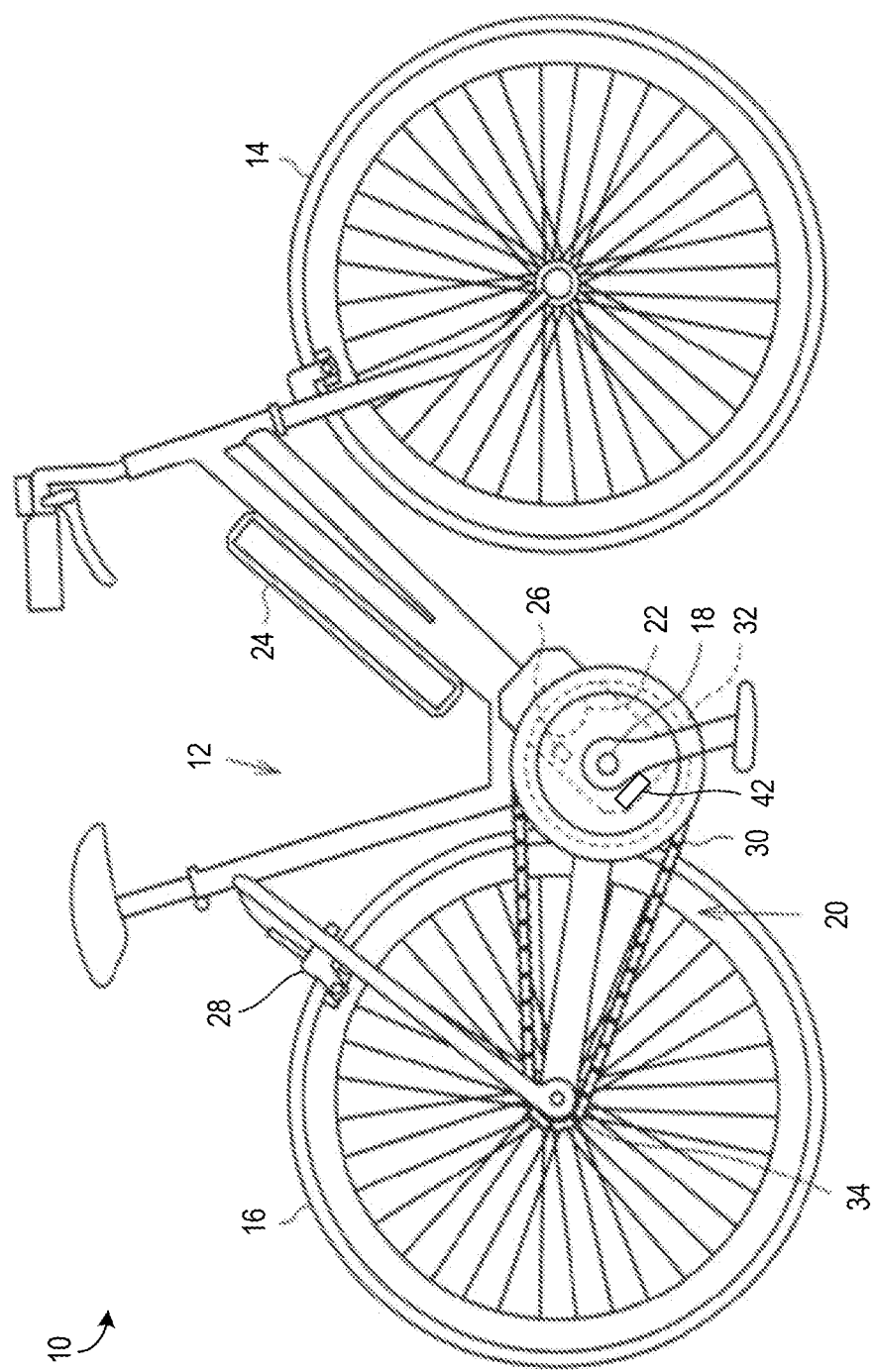
FIG. 1 illustrates a bicycle motor control system according to one embodiment of the present invention and is drawn approximately to scale unless otherwise indicated; however, other relative dimensions may be used, if desired.

Referring to FIG. 1, a bicycle motor control system 10 is provided according to one disclosed embodiment of the present invention. A drive assisted bicycle, configured to be driven by leg power of a user, is provided with a frame 12, wheels (front wheel 14 and rear wheel 16) that are arranged to be rotatable on the frame 12, a drive assist mechanism 20 with a drive motor 22 to provide driving force to the rear wheel 16, a battery 24, a controller 26, and a brake mechanism 28 that causes the wheels to stop.

The controller 26 may be affixed in proximity to the crankshaft of the bicycle. The controller 26 is configured to control the drive motor 22 based on a manual drive force. The controller 26 controls the drive motor 22 to rotate in a forward direction to assist the pedaling based on the amount of a positive torque detected by a force sensor 36 when the positive torque detected by a force sensor 36 exceeds a predetermined positive torque and the crank is rotating in a forward direction. For example, the predetermined positive torque is +7 Nm~+10 Nm. It will be appreciated that the force sensor 36 may be configured to detect a torque or manual drive force, so that, henceforth, the force sensor 36 shall be referred to in the following description as a torque sensor 36 or a manual drive force sensor 36, respectively, depending on the embodiment. The controller 26 is configured to control the drive motor 22 that is configured to selectively output driving force in accordance with the manual drive force from the user, and cause the drive motor 22 to stop when a detected manual drive force, sensed by a manual drive force sensor, falls below a predetermined force threshold value, which is set in accordance with a crank angle of a crankshaft 18. The drive motor 22 may be provided in a midship or rear placement configuration on the frame 12 of the bicycle. In this embodiment, the drive motor 22 is provided in a midship of the bicycle and configured in a drive unit together with a deceleration mechanism and sensory apparatus 42. The manual drive force derives from the pedal power of a user operating the bicycle. The battery 24 may be affixed to a rear carrier (not shown), a frame 12, or both the rear carrier and the frame 12. The battery 24 provides electrical power to the drive assist mechanism 20.

The drive assist mechanism 20 is equipped with a crankshaft 18, a chain 30 to transmit power from the crankshaft 18, and a rear sprocket 34 that is driven by chain 30 and is arranged on the axis of the rear wheel 16. A front sprocket 32 transmits rotational power from the crankshaft 18 to the chain 30, and the drive motor 22 provides drive assist to the rear wheel 16.

The rotational power of the crankshaft 18 is transmitted to the front sprocket 32 through the one-way clutch. The one-way clutch does not allow the rotational power of the crankshaft 18 to transmit to the front sprocket 32 when the crankshaft 18 rotates in a rearward (or counter-clockwise) direction, while allowing the rotational power of the crankshaft 18 to transmit to the front sprocket 32 when the crankshaft 18 rotates in a forward (or clockwise) direction. Rotation in a forward direction is defined as the rotational direction of the crankshaft 18 when the drive assisted bicycle moves in a forward direction. In other embodiments, a one-way clutch may not be provided in the transmission pathway between the crankshaft 18 and the front sprocket 32, in which case a user can operate a coaster brake that is provided on the hub of the rear wheel 16 when the crankshaft 18 rotates in a backward (or un-clockwise) direction.

The rotational power of the drive motor 22 is transmitted to the front sprocket 32 through the deceleration mechanism and a transmission mechanism. The deceleration mechanism, comprising a combination of multiple gears, provides output to the transmission mechanism to slow the rotational speed of the axis of the drive motor 22. The transmission mechanism is configured to mount the front sprocket 32. The transmission mechanism is coupled to the crankshaft 18. A one-way clutch may be provided in a transmission pathway between the drive motor 22 and the front sprocket 32. A sensory apparatus 42 is coupled to the transmission mechanism, providing within the apparatus a force sensor 36 and a crank rotation sensor 40.

A brake mechanism 28 is mounted on the bicycle to slow or stop the bicycle. When the controller 26 stops the motor while the drive motor 22 is rotated, the controller 12 causes the drive motor 22 to stop by at least one of a regenerative braking operation, dynamic braking operation, and power interruption to the drive motor, respectively. A regenerative braking operation performs regenerative charging in most embodiments, absorbing the inertia of the drive motor 22. A dynamic braking operation is, for example, an electromagnetic braking operation that absorbs the inertia of the drive motor 22. Power interruption to the drive motor may involve switching off the supply of electrical power from the battery 24 to the drive motor 22.

Figure 2:
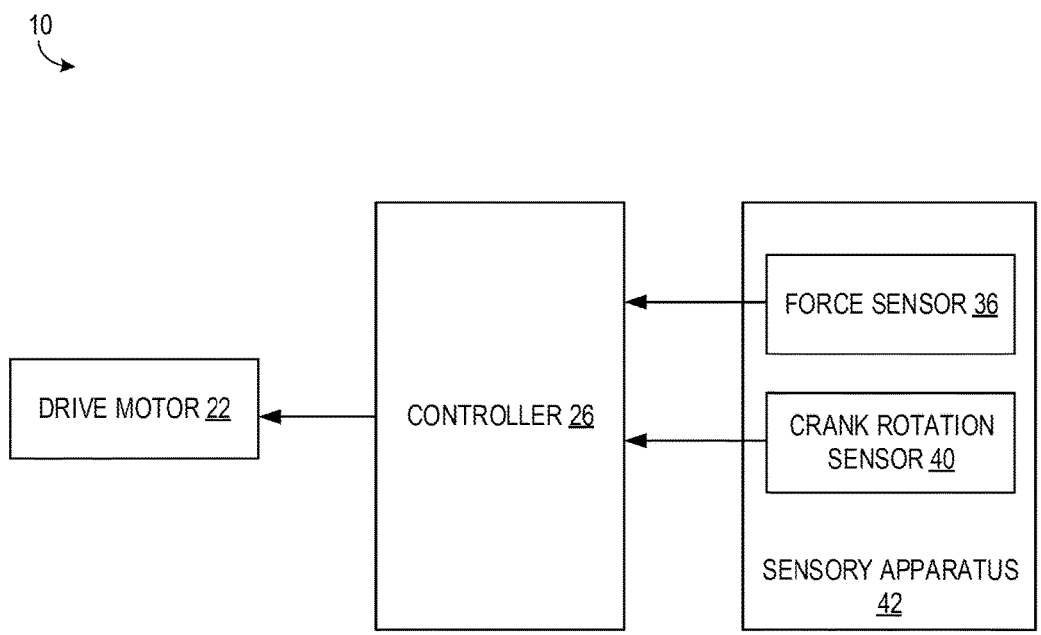
FIG. 2 is a block diagram relating to a controller, a sensory apparatus and drive motor in accordance with an embodiment of the present disclosure.

Referring to FIG. 2, the bicycle motor control system 10 comprises a controller 26, a sensory apparatus 42 and a drive motor 22. The controller 26 is configured to receive sensory input from the force sensor 36 and crank rotation sensor 40 that are provided in the sensory apparatus 42. The force sensor 36 is configured to be a torque sensor or manual drive force sensor. The controller 26 includes a processor, memory, and an inverter for activating the drive motor 22. The memory is preferably non-volatile. The controller 26 is communicatively coupled with the drive motor 22. In certain embodiments, the controller 26 may communicate with the drive motor 22 via a wired connection, e.g. PCL (power communication line) system, while in other embodiments, the controller 26 may communicate with the drive motor 22 via a wireless connection. In this case, the inverter communicates with the drive motor 22 via a wired connection.

The controller 26 of the bicycle is configured to receive input from a force sensor 36 and crank rotation sensor 40 that are communicatively coupled with the controller 26 and provided in a sensory apparatus 42 that is positioned in proximity to the crankshaft. However, in other embodiments, the two sensors may be provided in separate apparatuses. The force sensor 36 detects the manual drive force that is applied onto the crankshaft. For example, the force sensor 36 may comprise a sensor that detects a magnet that is affixed to the power transmission parts that are provided to transmit the rotational power of the crankshaft 18 to the front sprocket 32. The manual drive force is a torque that corresponds to the pedal power that is exerted on the pedals of the drive assisted bicycle. The crank rotation sensor 40 detects the crank angle of the crank shaft 18. For example, the crank rotation sensor may detect a magnet that is affixed to the crank shaft 18.

Figure 3:
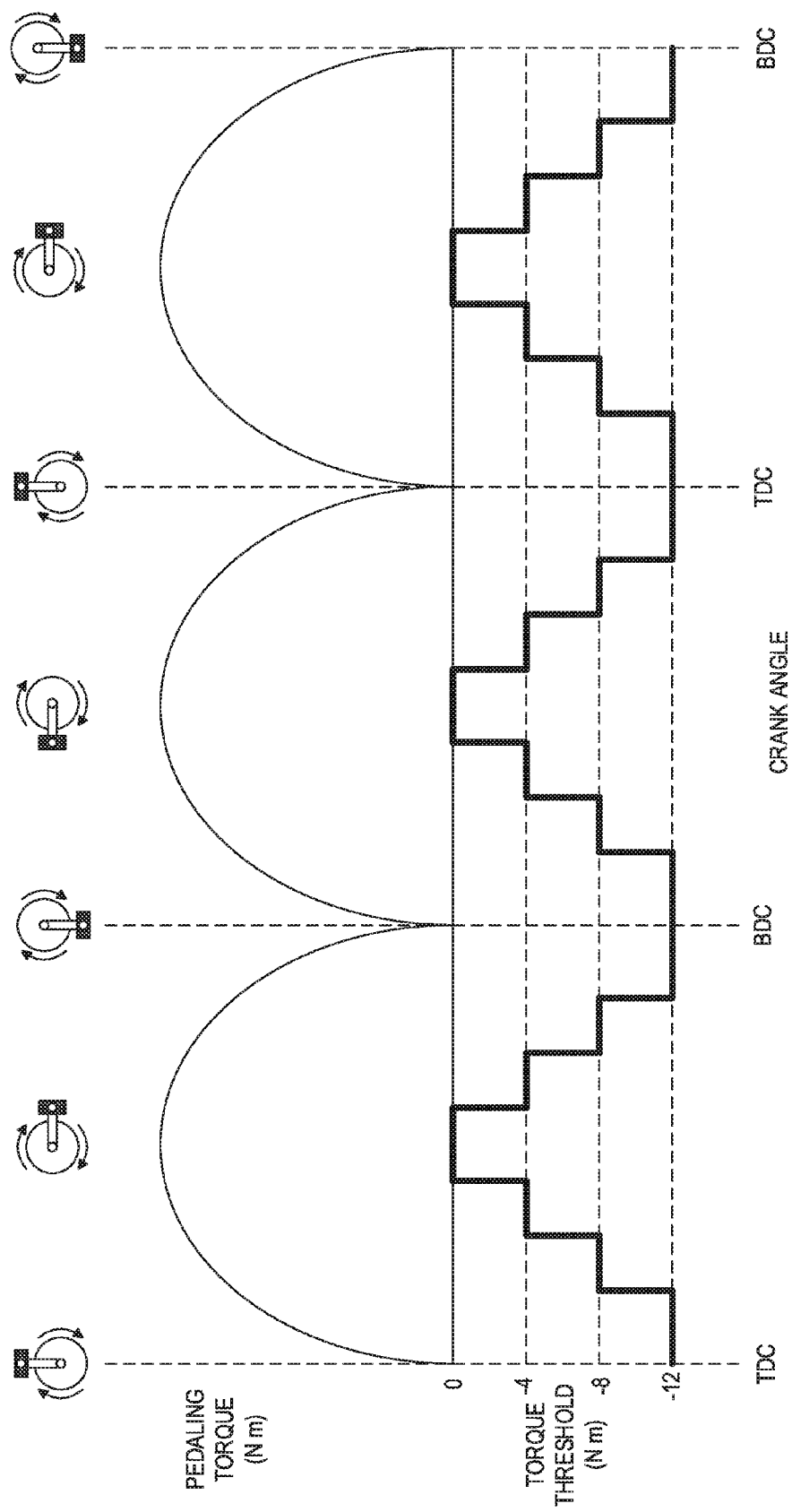
FIG. 3 illustrates predetermined torque threshold values for stopping a drive motor at given crank angles and pedaling torque values according to one embodiment of the present invention.

FIG. 3 illustrates predetermined torque threshold values for stopping a drive motor at given crank angles, represented by the icons on the top portion of FIG. 3, according to one embodiment of the present invention. Also illustrated is the pedaling torque that is usually measured for each crank angle when the user engages in normal, forward pedaling. It will be appreciated that multiple predetermined torque threshold values are provided for each crank angle in a normal, forward pedaling state. The multiple predetermined torque threshold values may include at least three threshold values. In this embodiment, the controller 26 is configured to cause the drive motor 22 to stop when a negative torque, sensed by the torque sensor 36, is detected to fall below a predetermined torque threshold value when a forward rotation of the crankshaft 18, sensed by the crank rotation sensor 40, is detected. In other embodiments, a force threshold value corresponding to a negative torque may be sensed instead, so that the controller 26 is configured to cause the drive motor 22 to stop when a detected manual drive force, sensed by the manual drive force sensor 36, falls below a predetermined force threshold value, which corresponds to a negative torque sensed by a torque sensor 36 when the crank angle is within a predetermined crank angle range. In theory, the ideal torque threshold value for stopping the drive motor 22 would be zero at the top dead center or the bottom dead center, but in practice, this setting may cause the drive motor to undesirably stop at the top dead center and bottom dead center angles of the crankshaft, when the pedaling torque is approximately zero. Thus, the predetermined torque threshold value is set at the lowest negative value (for example, −12 Nm) at the top dead center (TDC) or bottom dead center (BDC) angle, at which a pedaling torque value of zero is usually measured when the user engages in normal, forward pedaling. If the accuracy of the torque sensor 36 is compromised at low torque values, the torque threshold values at the top dead center and bottom dead center angles may be adjusted to allow for a wider margin of error. In accordance with this configuration, it is possible to avoid the unintentional stoppage of assist power when the rider is coasting with one pedal at top dead center and one at bottom dead center.

As shown in FIG. 3, the torque threshold value is set at zero for crank angles that are spaced approximately 90 degrees between a top dead center angle and a bottom dead center angle, at which the most positive torque is usually measured when the user engages in normal, forward pedaling. This configuration is especially advantageous for bicycles with coaster brakes, since the coaster brake is usually applied at crank angles between the top dead center and the bottom dead center. The crank angles at which a torque threshold value is set at zero may be defined as a crank angle range—for example, a crank angle range of 85° to 105° from the top dead center crank angle. Likewise, the crank angles at which a torque threshold value is set at the lowest negative value may also be defined as a crank angle range—for example, a crank angle range of ±20° from the top dead center or the bottom dead center angle.

Figure 4:
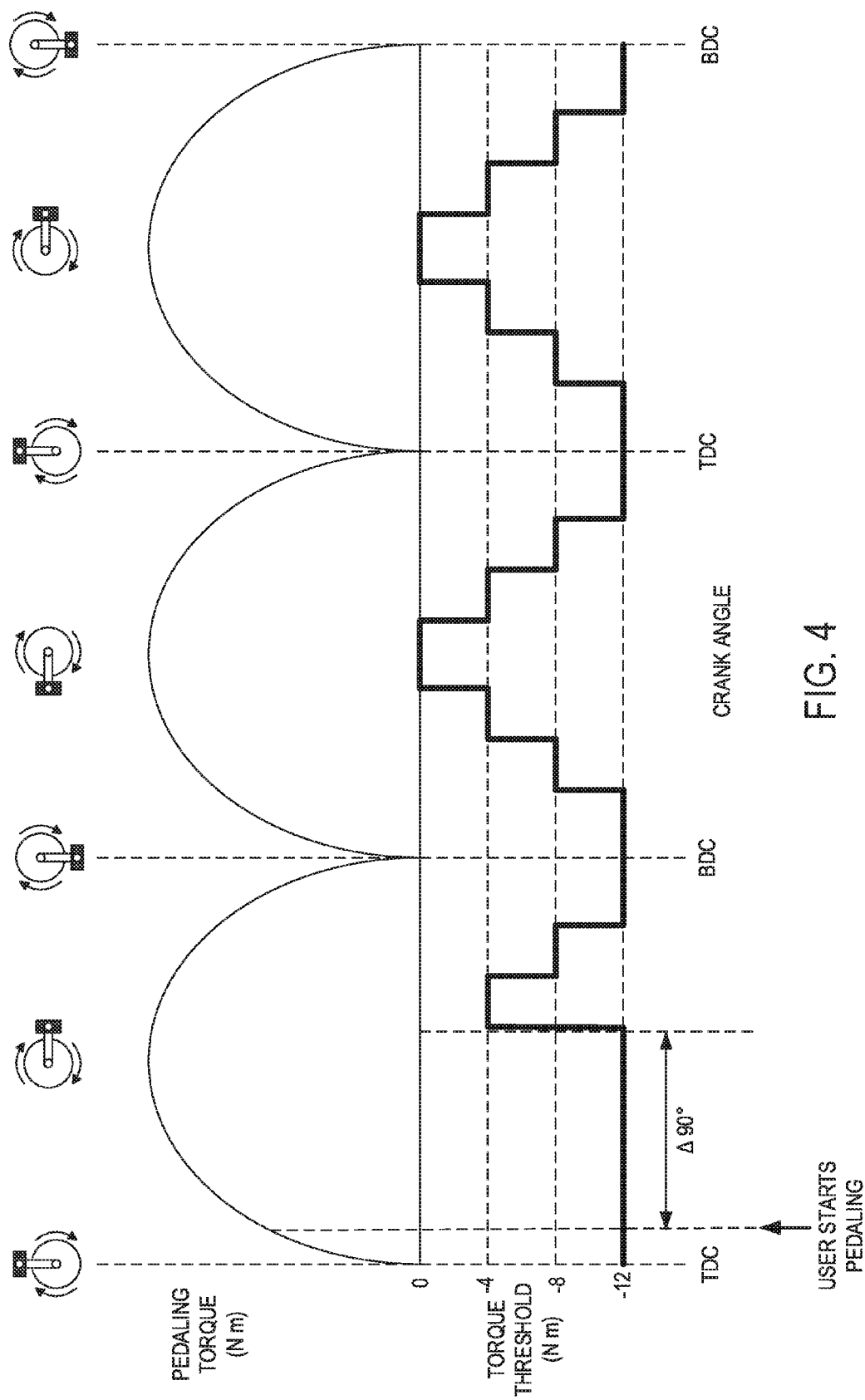
FIG. 4 illustrates predetermined torque threshold values for stopping a drive motor at given crank angles and pedaling torque values according to another embodiment of the present invention.

FIG. 4 illustrates predetermined torque threshold values for stopping a drive motor at given crank angles, represented by the icons on the top portion of FIG. 4, according to an embodiment of the present invention in which the user is starting to engage in normal, forward pedaling. In this embodiment, when the user starts to pedal, the torque threshold is set to the lowest negative value for a predetermined crank angle range of the crank cycle following the start of pedaling before resuming the multiple predetermined torque threshold values that are provided for each crank angle in a normal, forward pedaling state. The controller may sense that the user is starting to pedal by detecting a pedaling torque that reaches the positive torque threshold value (for example, +12 Nm) at a given crank angle. The crank angle range for keeping the torque threshold at the lowest negative value is not particularly limited, and may be approximately the first 90 degrees of the crank cycle from the crank angle at which the user starts pedaling. In accordance with this embodiment of this invention, the user may avoid inadvertently stopping the drive motor by unintentionally backpedaling when the rider is just starting pedaling and the rider's feet are transitioning from the ground to the pedals.

Figure 5:
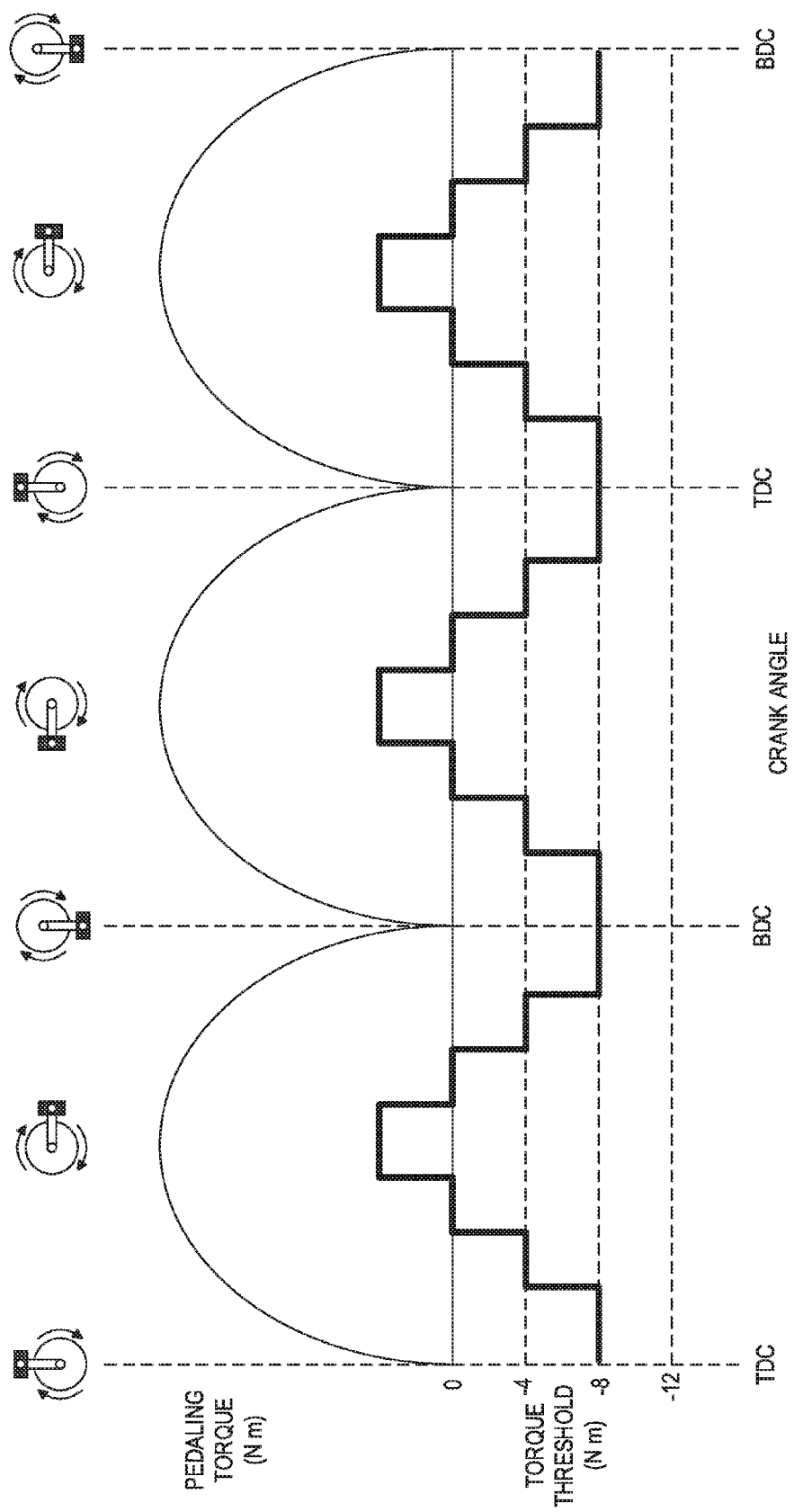
FIG. 5 illustrates predetermined torque threshold values for stopping a drive motor at given crank angles according to another embodiment of the present invention.

FIG. 5 illustrates predetermined torque threshold values for stopping a drive motor at given crank angles, represented by the icons on the top portion of FIG. 5, according to another embodiment of the present invention. In this embodiment, the controller 26 is configured to cause the drive motor 22 to stop when a positive torque, sensed by a torque sensor 36, is detected to fall below a predetermined torque threshold value, and the predetermined torque threshold value is set between a top dead center crank angle and a bottom dead center crank angle. In this embodiment, the torque threshold value is set at a positive value for crank angles that are spaced approximately 90 degrees between a top dead center angle and a bottom dead center angle, at which the most positive torque is usually measured when the user engages in normal, forward pedaling. This configuration is also advantageous for bicycles with coaster brakes, since the coaster brake is usually applied at crank angles between the top dead center and the bottom dead center, and the user may easily stop the drive motor 22, even before applying the brakes, just by easing the application of positive torque on the crankshaft at crank angles between the top dead center and the bottom dead center, enhancing the user experience. The crank angles at which a torque threshold value is set at a positive value may be defined as a crank angle range—for example, a crank angle range of 85° to 105° from the top dead center crank angle. Like the embodiment of FIG. 3, the predetermined torque threshold value is also set at the lowest negative value at the top dead center (TDC) or bottom dead center (BDC) angle, at which a pedaling torque value of zero is usually measured when the user engages in normal, forward pedaling. The torque threshold value that is set at a positive value for crank angles is smaller than the predetermined positive torque to start the drive motor 22.

It will be appreciated that the torque threshold values described above may be adjusted lower or higher based on the cadence of the crankshaft that is sensed by the crank rotation sensor. For example, a set adjusting threshold value could be subtracted from the torque threshold value depending on the current cadence of the crankshaft as detected by a crank rotation sensor. In this manner, a plurality of torque adjustment cadence ranges may be provided, including at least one lower cadence range and at least one higher cadence range than the that is higher than the lower cadence range, and the predetermined torque threshold value may be adjusted higher when a current cadence is detected that falls in the lower cadence range and lower when a current cadence is detected that falls in the higher cadence range. As one specific example, if the first torque threshold value is a predetermined value such as −4 Nm, the controller may keep the torque threshold value at −4 Nm when the sensed cadence is between a first torque adjustment cadence range of 0 to 30 rpm, lower the torque threshold value to a value such as −6 Nm at a sensed cadence in a second torque adjustment range of 31 to 60 rpm, to −8 Nm at a sensed cadence in a third torque adjustment range of 61 to 90 rpm, and to −10 Nm at a sensed cadence in a fourth torque adjustment range of 91 rpm or above. The set adjusting threshold value may be continuously changed by the controller, depending on the current cadence of the crankshaft.

Figure 6A:
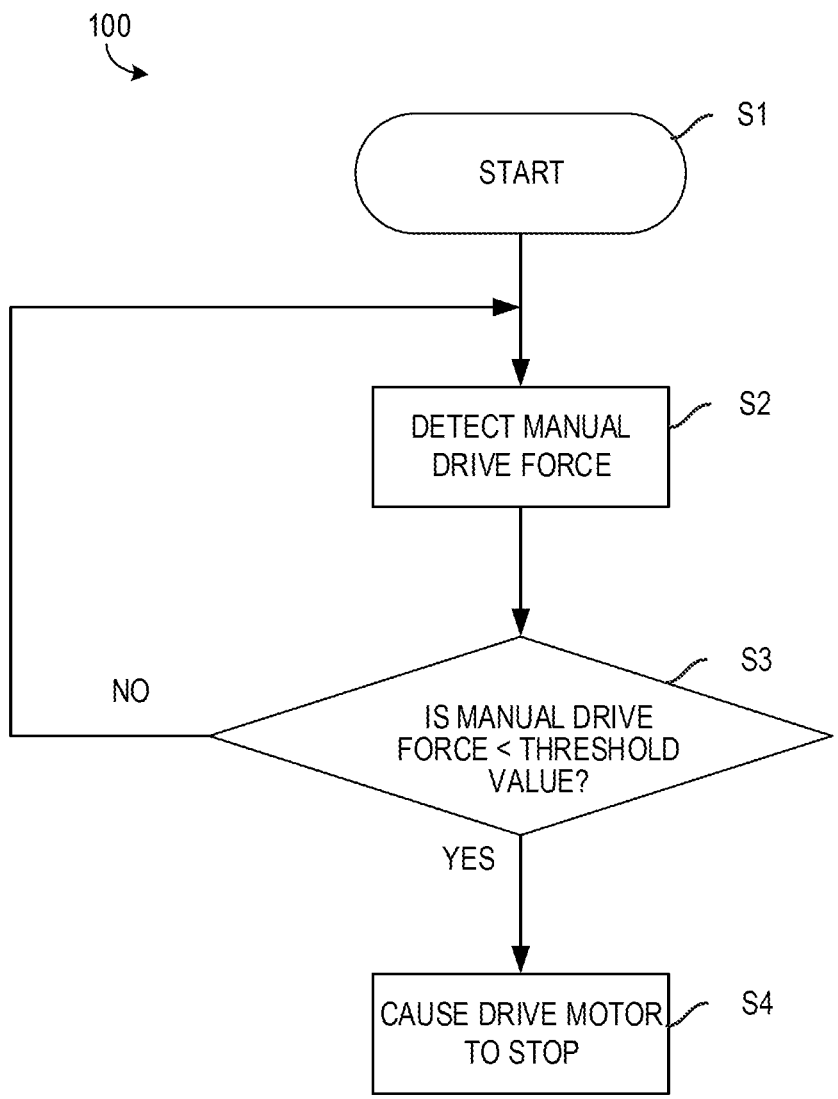
FIGS. 6A-D are flowcharts illustrating the method implemented by program logic executed by the processor of the controller according to another embodiment of the present invention.

Referring to FIG. 6A, illustrated is a flowchart depicting a method 100 implemented by program logic executed by the processor of the controller 26 according to one embodiment of the present invention. This flowchart is carried out by the controller 26 when the drive motor 22 is not stopping. At step S1, the controller 26 initiates the algorithm for determining the timing to cause the drive motor 22 to stop. At step S2, a manual drive force sensor 36 senses a manual drive force. At step S3, the controller 26 determines whether or not the detected manual drive force, sensed by the manual drive force sensor 36, falls below the predetermined force threshold value, which is set in accordance with a crank angle of the crankshaft 18. The detected manual drive force is intended to be an approximation of torque, so that the predetermined force threshold value corresponds to a negative torque value sensed by a torque sensor 36 when the crank angle is within a predetermined crank angle range, which is ideally at a top or bottom dead center crank angle. As explained in FIG. 3, the predetermined force threshold value, corresponding to a negative torque threshold value, is best set as a negative value at the top or bottom dead center angle, so that drive motor will not inconsistently stop at the top dead center and bottom dead center angles of the crankshaft when the threshold value is set at zero. If the detected manual drive force exceeds the threshold value, no action is taken and the manual drive force sensor 36 resumes detecting manual drive force. If the detected manual drive force is less than the threshold value, the controller 26 causes the drive motor 22 to stop by at least one of a regenerative braking operation, dynamic braking operation, and power interruption to the drive motor 22 (step S4).

Figure 6B:
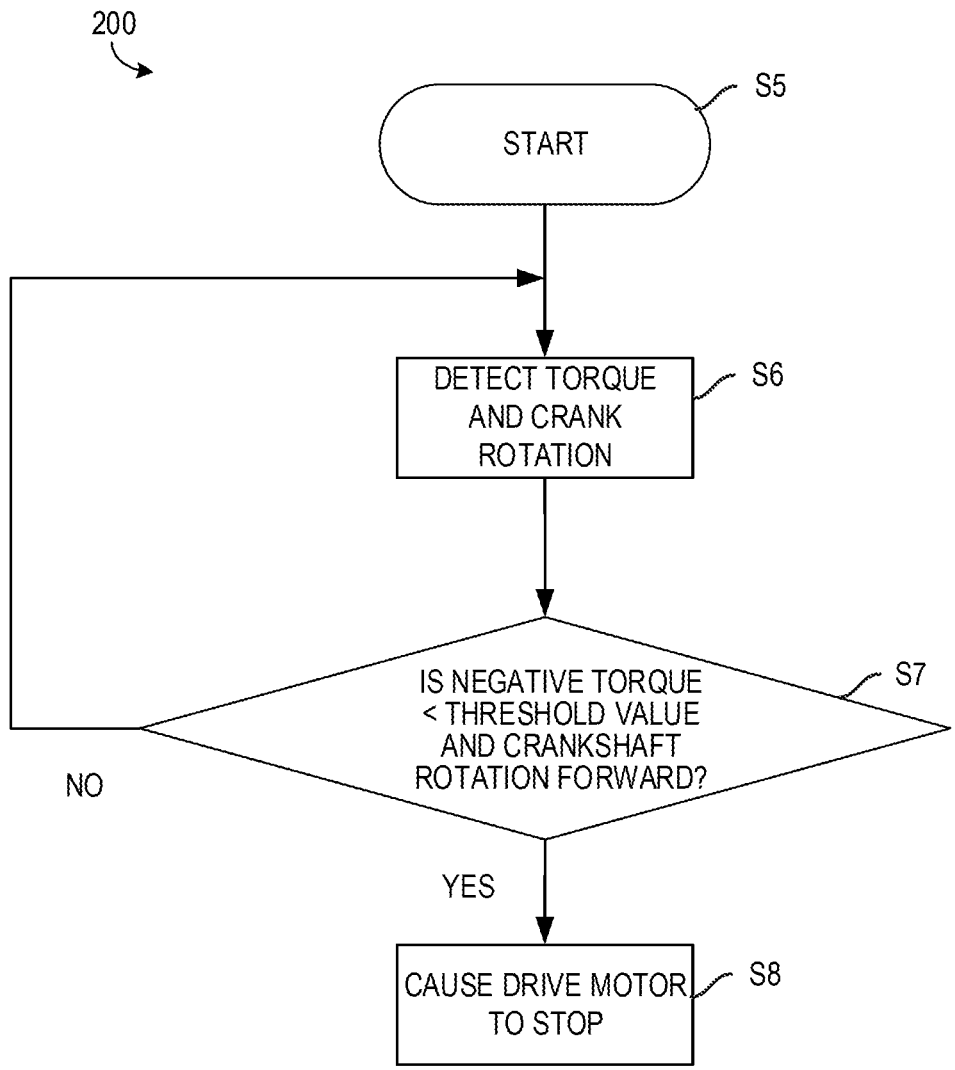

Referring to FIG. 6B, illustrated is a flowchart depicting a method 200 implemented by program logic executed by the processor of the controller 26 according to one embodiment of the present invention. This flowchart is carried out by the controller 26 when the drive motor 22 is not stopping. At step S5, the controller 26 initiates the algorithm for determining the timing to cause the drive motor 22 to stop. At step S6, a crank rotation sensor 40 senses a rotation of the crankshaft 18 and a torque sensor 36 detects the torque from the power transmission parts. The torque corresponds to the pedal power that is exerted on the pedals of the drive assisted bicycle. At step S7, the controller 26 determines whether or not a negative torque, sensed by a torque sensor 36, is detected to fall below a predetermined torque threshold value when a forward rotation of the crankshaft 18, sensed by a crank rotation sensor 40, is detected. If both conditions are not met, no action is taken and the crank rotation sensor 40 and torque sensor 36 resume detecting the rotation of the crankshaft 18 and the torque from the power transmission parts, respectively. If both conditions are met, the controller 26 causes the drive motor 22 to stop by at least one of a regenerative braking operation, dynamic braking operation, and power interruption to the drive motor 22 (step S8).

Figure 6C:
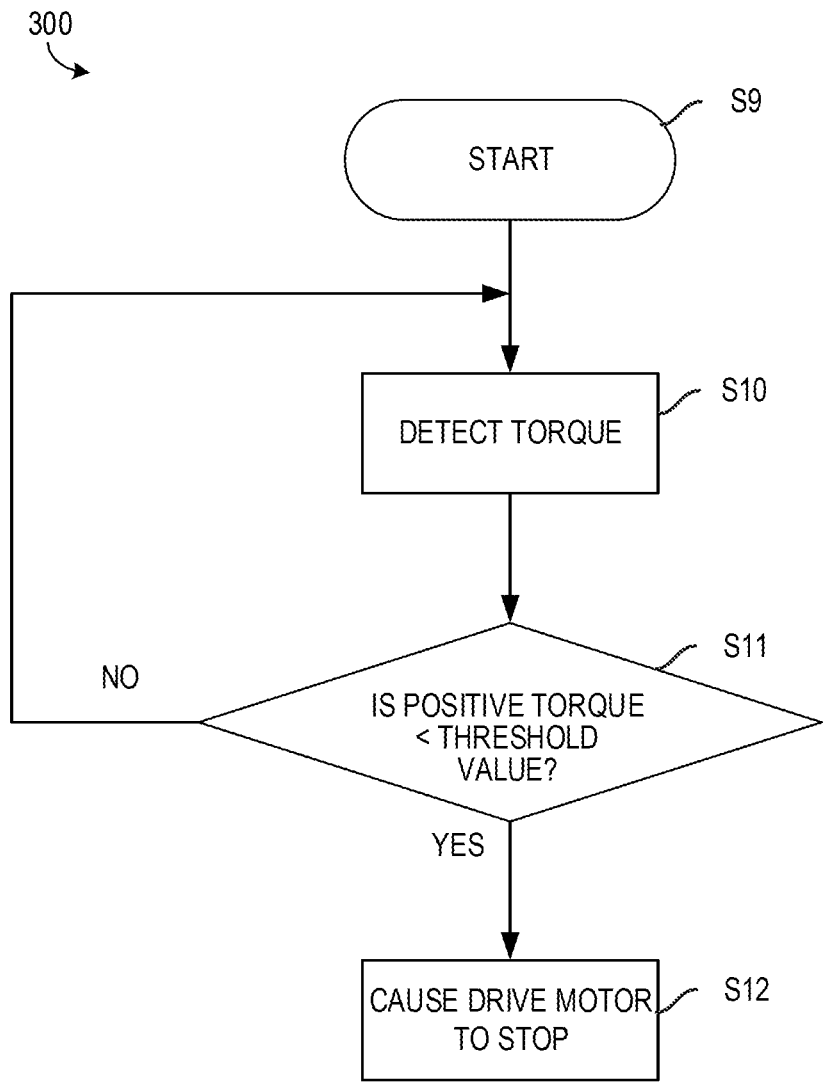

Referring to FIG. 6C, illustrated is a flowchart depicting a method 300 implemented by program logic executed by the processor of the controller 26 according to one embodiment of the present invention. This flowchart is carried out by the controller 26 when the drive motor 22 is not stopping. At step S9, the controller 26 initiates the algorithm for determining the timing to cause the drive motor 22 to stop. At step S10, the torque sensor 36 detects the torque from the power transmission parts. The torque corresponds to the pedal power that is exerted on the pedals of the drive assisted bicycle. At step S11, the controller 26 determines whether or not a positive torque, sensed by a torque sensor, is detected to fall below a predetermined torque threshold value. As explained in FIG. 3, a positive torque threshold value is ideally set at crank angles that are spaced approximately 90 degrees between a top dead center angle and a bottom dead center angle, at which the most positive torque is usually measured when the user engages in normal, forward pedaling. Thus, step S11 may be further limited, so that the controller 26 determines whether or not the positive torque, sensed by a torque sensor 36, is detected to fall below a predetermined torque threshold between a top dead center crank angle and a bottom dead center crank angle. If the positive torque meets or exceeds the threshold, no action is taken and the torque sensor 36 resume detecting the torque from the power transmission parts. If the positive torque is detected to fall below the threshold, the controller 26 causes the drive motor 22 to stop by at least one of a regenerative braking operation, dynamic braking operation, and power interruption to the drive motor (step S12).

Figure 6D:
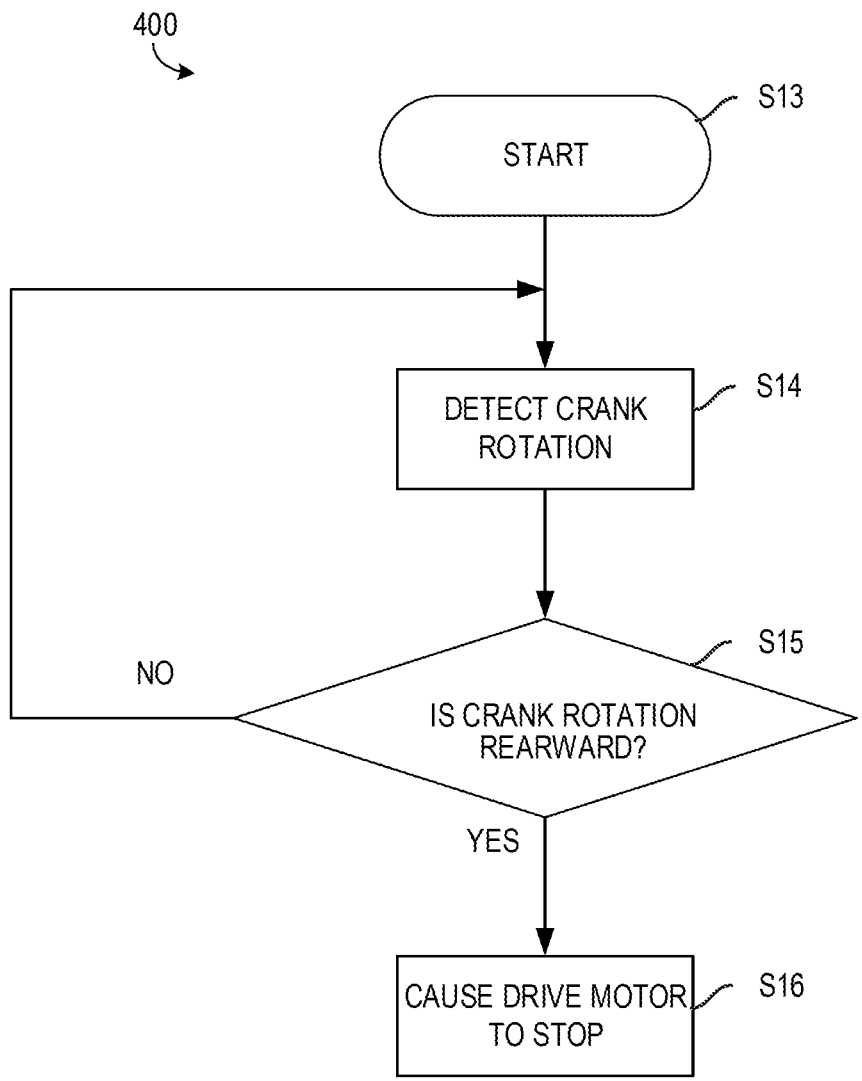

Referring to FIG. 6D, illustrated is a flowchart depicting a method 400 implemented by program logic executed by the processor of the controller 26 according to one embodiment of the present invention. This flowchart is carried out by the controller 26 when the drive motor 22 is not stopping. At step S13, the controller 26 initiates the algorithm for determining the timing to cause the drive motor 22 to stop. At step S14, a crank rotation sensor 40 detects the rotation of the crankshaft 18. At step S15, the controller determines whether or not a rearward rotation of the crankshaft 18, sensed by a crank rotation sensor 40, is detected. If a rearward rotation of the crankshaft 18 is not detected, no action is taken and the crankshaft rotation sensor 40 resumes detecting the rotation of the crankshaft. If a rearward rotation of the crankshaft 18 is detected, the controller 26 causes the drive motor 22 to stop by at least one of a regenerative braking operation, dynamic braking operation, and power interruption to the drive motor 22 (step S16).

Figure 7:
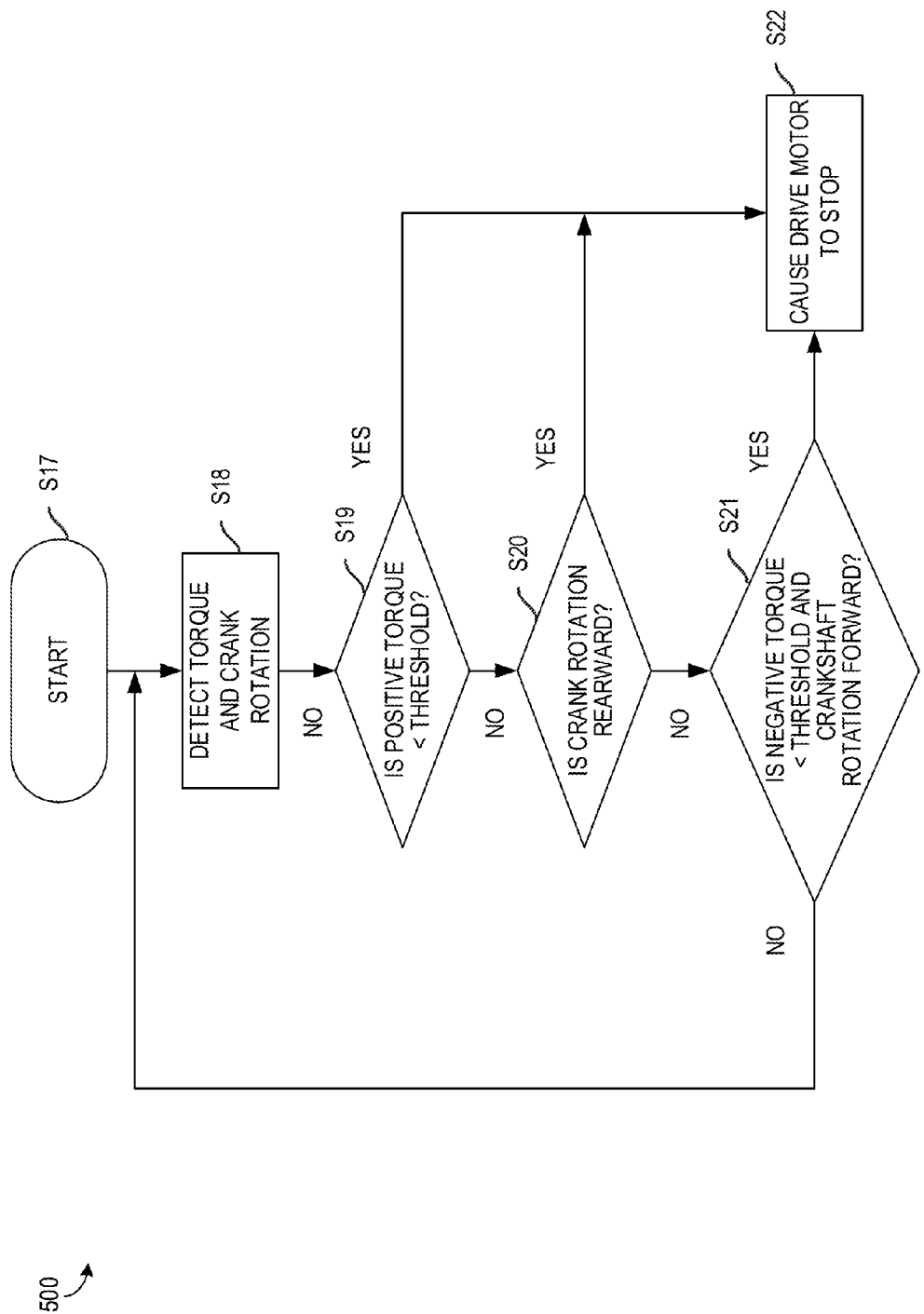
FIG. 7 is a flowchart illustrating the method implemented by program logic executed by the processor of the controller according to yet another embodiment of the present invention.

Referring to FIG. 7, illustrated is a flowchart depicting a method 500 implemented by program logic executed by the processor of the controller 26 according to one embodiment of the present invention. This flowchart is carried out by the controller 26 when the drive motor 22 is not stopping. In this embodiment, the controller 26 is configured to control a drive motor 22 that is configured to selectively output driving force in accordance with a manual drive force, and cause the drive motor 22 to stop when one of a plurality of conditions is satisfied. The plurality of conditions are outlined in steps S19 through S21 and are similar to the embodiments described in FIGS. 6B through 6D. At step S17, the controller initiates the algorithm for determining the timing to cause the drive motor 22 to stop. At step S18, a crank rotation sensor senses a rotation of the crankshaft 18 and a torque sensor 36 detects the torque from the power transmission parts. The torque corresponds to the pedal power that is exerted on the pedals of the drive assisted bicycle. Then at steps S19 through S21, the controller determines whether or not one of the plurality of conditions is satisfied. If any one of the plurality of the conditions is satisfied, then the controller 26 causes the drive motor 22 to stop by at least one of a regenerative braking operation, dynamic braking operation, and power interruption to the drive motor 22 (step S22). Otherwise, no action is taken and the crank rotation sensor 40 and torque sensor 36 resume detecting the rotation of the crankshaft 18 and the torque from the power transmission parts, respectively.

Referring again to FIG. 7, the plurality of conditions include: when a positive torque, sensed by the torque sensor, is detected to fall below a predetermined torque threshold value (step S19). This condition corresponds to the condition outlined in step S11 of method 300 as illustrated in FIG. 6C. Another one of the conditions is when a rearward rotation of the crankshaft, sensed by the crank rotation sensor, is detected (step S20). This condition corresponds to the condition outlined in step S15 of method 400 as illustrated in FIG. 6D. Yet another one of the conditions is when a negative torque, sensed by a torque sensor, falls below a predetermined torque threshold value and a forward rotation of a crankshaft, sensed by a crank rotation sensor, are detected (step S21). This condition corresponds to the condition outlined in step S7 of method 200 as illustrated in FIG. 6B. The condition of step S21 may be further limited, so that a negative torque, sensed by a torque sensor, and a forward rotation of a crankshaft, sensed by a crank rotation sensor, must be detected at a predetermined crank angle, which is ideally at a top or bottom dead center crank angle. In other embodiments of step S21, when a forward rotation of a crankshaft is detected, a detected negative torque may not need to fall below a predetermined threshold to cause the drive motor to stop. In such a case, the condition is when a negative torque of any value, sensed by a torque sensor, and a forward rotation of a crankshaft, sensed by a crank rotation sensor, are detected. As explained in FIG. 3, the predetermined torque threshold value is best set as a negative value at the top or bottom dead center angle, so that drive motor will not inconsistently stop at the top dead center and bottom dead center angles of the crankshaft when the threshold value is set at zero. The most preferable embodiment is one in which any one of the above three conditions is satisfied for the controller to cause the drive motor to stop. However, in other embodiments, one of only one or two of the above three conditions may be satisfied for the controller to cause the drive motor to stop.

It will be appreciated that the above described bicycle motor control system may be used to control the application of assist power from the motor in a manner that potentially avoids the issues associated with prior systems, namely, unintentional actuation of a coaster brake when backpedaling to stop assist power, and unintentional stoppage of assist power when a rider unintentionally backpedals as the rider is just starting pedaling and the rider's feet are transitioning from the ground to the pedals, or when the rider is coasting with one pedal at top dead center and one at bottom dead center.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "fixed" and their derivatives except for the terms "bonded" and "bonding."

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "bicycle" and its derivatives, as used herein, are intended to be open ended terms that specify any vehicle or machine with a wheel that is propelled by the action of a cyclist's feet upon pedals, and encompasses outdoor bicycles, stationary bicycles, exercise cycles, indoor bicycles, and the like.

Finally, terms of degree such as "substantially", "about" and "approximately" as used herein mean a reasonable amount of deviation of the modified term such that the end result is not significantly changed (e.g., manufacturing tolerances).

Obviously, numerous modifications and variations of the present invention are possible in light of the above teachings. It is therefore to be understood that within the scope of the appended claims, the invention may be practiced otherwise than as specifically described herein.

The invention claimed is:

1. A bicycle motor control system, configured to control a drive motor that outputs drive force to a rear wheel that is provided on a bicycle comprising a crankshaft that outputs manual drive force to the rear wheel via a sprocket and a chain, the bicycle motor control system comprising:
   a controller configured to control the drive motor that is configured to selectively output driving force in accordance with the manual drive force, and cause the drive motor to stop when a detected manual drive force, sensed by a manual drive force sensor, falls below one of a plurality of predetermined force threshold values, which are set stepwise in accordance with a crank angle of the crankshaft, the crank angle being sensed by a crank rotation sensor, wherein
   minimum predetermined force threshold values are set in accordance with a top dead center crank angle and a bottom dead center crank angle.

2. The bicycle motor control system of claim 1, wherein the controller is configured to cause the drive motor to stop by at least one of a regenerative braking operation, dynamic braking operation, and power interruption to the drive motor.

3. The bicycle motor control system of claim 1, wherein the predetermined force threshold values correspond to a torque of less than zero that is sensed by a torque sensor when the crank angle is within a predetermined crank angle range.

4. The bicycle motor control system of claim 1, wherein the predetermined force threshold values correspond to threshold manual drive forces that are measured at crank angles, sensed by the crank rotation sensor, at a top dead center crank angle or a bottom dead center crank angle.

5. The bicycle motor control system of claim 1, wherein the controller is configured to cause the drive motor to stop when a torque of less than zero, sensed by a torque sensor, is detected to fall below one of a plurality of predetermined torque threshold values when a forward rotation of the crankshaft, sensed by the crank rotation sensor, is detected,
   the predetermined torque threshold values are set stepwise in accordance with the crank angle of the crankshaft, the crank angle being sensed by the crank rotation sensor, and
   the torque of less than zero corresponds to a backpedaling motion that does not actuate a brake, when the crankshaft is not rotating rearward.

6. The bicycle motor control system of claim 1, wherein the controller is configured to cause the drive motor to stop when a rearward rotation of the crankshaft, sensed by the crank rotation sensor, is detected.

7. The bicycle motor control system of claim 1, wherein the controller is configured to cause the drive motor to stop when a positive torque, sensed by a torque sensor, is detected to fall below one of a plurality of predetermined torque threshold values that are set stepwise in accordance with the crank angle of the crankshaft, the crank angle being sensed by the crank rotation sensor.

8. The bicycle motor control system of claim 7, wherein the predetermined torque threshold values correspond to torques that are measured at crank angles, sensed by the crank rotation sensor, between a top dead center crank angle and a bottom dead center crank angle.

9. The bicycle motor control system of claim 1, wherein the drive motor is provided in a midship or rear placement configuration on a frame of the bicycle.

10. A bicycle motor control system, configured to control a drive motor that outputs drive force to a rear wheel that is provided on a bicycle comprising a crankshaft that outputs manual drive force to the rear wheel via a sprocket and a chain, the bicycle motor control system comprising:
    a controller configured to control the drive motor that is configured to selectively output driving force in accordance with the manual drive force, and cause the drive motor to stop when a plurality of conditions is satisfied, wherein the plurality of conditions include:
    when a torque of less than zero is sensed by a torque sensor, and a forward rotation of the crankshaft that is greater than a rotation speed threshold of zero is sensed by a crank rotation sensor, wherein
    the torque of less than zero corresponds to a backpedaling effort that does not actuate a brake, the backpedaling effort being exerted against the crankshaft that is not rotating rearward.

11. The bicycle motor control system of claim 10, wherein the plurality of conditions include:
    when a rearward rotation of the crankshaft, sensed by the crank rotation sensor, is detected.

12. The bicycle motor control system of claim 10, wherein the plurality of conditions include:

when a positive torque, sensed by the torque sensor, is detected to fall below a predetermined torque threshold value.

13. The bicycle motor control system of claim 10, wherein the controller is configured to cause the drive motor to stop by at least one of a regenerative braking operation, dynamic braking operation, or power interruption to the drive motor.

14. The bicycle motor control system of claim 10, wherein the controller is configured to cause the drive motor to stop when the torque of less than zero, sensed by the torque sensor, is detected to fall below a predetermined torque threshold value.

15. The bicycle motor control system of claim 10, wherein the controller is configured to cause the drive motor to stop when the torque of less than zero, sensed by the torque sensor, is detected at a predetermined crank angle when the forward rotation of the crankshaft, sensed by the crank rotation sensor, is detected.

16. The bicycle motor control system of claim 15, wherein the predetermined crank angle is a top dead center crank angle or bottom dead center crank angle.

17. The bicycle motor control system of claim 10, wherein the drive motor is provided in a midship or rear placement configuration on a frame.

18. The bicycle motor control system of claim 12, wherein the predetermined torque threshold value is adjusted based on a cadence of the crankshaft that is sensed by the crank rotation sensor.

19. The bicycle motor control system of claim 18, wherein a plurality of torque adjustment cadence ranges are provided, including a lower cadence range and a higher cadence range that is higher than the lower cadence range; and wherein the predetermined torque threshold value is adjusted higher when a current cadence is detected that falls in the lower cadence range and lower when a current cadence is detected that falls in the higher cadence range.

* * * * *